United States Patent
Ishihara (10) Patent No.: US 9,573,299 B2
(45) Date of Patent: Feb. 21, 2017

(54) METHOD FOR MANUFACTURING MOLD FOR MOLDING TIRE AND MOLD FOR MOLDING TIRE

(71) Applicant: BRIDGESTONE CORPORATION, Tokyo (JP)

(72) Inventor: Yasuyuki Ishihara, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/785,552

(22) PCT Filed: Mar. 20, 2014

(86) PCT No.: PCT/JP2014/057798
§ 371 (c)(1),
(2) Date: Oct. 19, 2015

(87) PCT Pub. No.: WO2014/188770
PCT Pub. Date: Nov. 27, 2014

(65) Prior Publication Data
US 2016/0075055 A1 Mar. 17, 2016

(30) Foreign Application Priority Data
May 20, 2013 (JP) .................................. 2013-106045

(51) Int. Cl.
*B22D 19/06* (2006.01)
*B29D 30/06* (2006.01)
(Continued)

(52) U.S. Cl.
CPC ....... *B29C 33/3842* (2013.01); *B22D 19/0072* (2013.01); *B22D 19/06* (2013.01);
(Continued)

(58) Field of Classification Search
CPC . B29C 33/10; B29C 33/3842; B29D 30/0606; B29D 2030/0617; B22D 19/0072; B22D 19/06
See application file for complete search history.

(56) References Cited

U.S. PATENT DOCUMENTS 2,263,001 A * 11/1941 Gunsaulus et al. B29D 30/0606
164/10
2,843,896 A * 7/1958 Rinella ................. B29C 33/442
249/68
(Continued)

FOREIGN PATENT DOCUMENTS

EP 0396060 A2 11/1990
EP 2669078 A1 12/2013
(Continued)

OTHER PUBLICATIONS

Jul. 1, 2014 International Search Report issued in International Patent Application No. PCT/JP2014/057798.
(Continued)

*Primary Examiner* — James Mackey
(74) *Attorney, Agent, or Firm* — Oliff PLC (57) ABSTRACT

A vent hole of a mold for molding a tire is formed by suppressing bending deformation of a wire in a casting mold. By using a relational expression among a length of a wire in a casting space, a diameter of the wire, a contact angle of the wire with respect to a molten metal, and a bent amount of the wire by casting acquired by experiments, the contact angle of the wire at which the bent amount of the wire is within an allowable range is calculated from conditions of an actual length and the diameter of the wire. On the basis of the calculated contact angle of the wire, the wire is disposed in the casting space. By pouring the molten metal into the casting space, a cast metal with the wire cast-in in
(Continued)

the casting space is cast. A vent hole is formed by withdrawing the wire.

4 Claims, 4 Drawing Sheets

(51) Int. Cl.
    *B29C 33/38*     (2006.01)
    *B22D 19/00*     (2006.01)
    *C22C 21/04*     (2006.01)
    *C22C 21/08*     (2006.01)

(52) U.S. Cl.
    CPC .......... *B29D 30/0606* (2013.01); *C22C 21/04* (2013.01); *C22C 21/08* (2013.01); *B29D 2030/0607* (2013.01); *B29D 2030/0617* (2013.01); *B29K 2905/02* (2013.01)

(56) References Cited

U.S. PATENT DOCUMENTS

| | | | |
|---|---|---|---|
| 5,066,209 A | 11/1991 | Schmaderer et al. | |
| 6,491,854 B1 * | 12/2002 | Sano | B22D 19/00 164/24 |
| 7,402,031 B2 * | 7/2008 | Hyakutake | B22C 9/02 425/28.1 |
| 8,689,855 B2 * | 4/2014 | Enokido | B22C 9/02 164/23 |
| 8,714,953 B2 * | 5/2014 | Takada | B22C 9/02 164/10 |
| 9,085,114 B2 * | 7/2015 | Gaebelein | B22D 19/0072 |
| 2012/0256349 A1 | 10/2012 | Ohara | |

FOREIGN PATENT DOCUMENTS

| | | |
|---|---|---|
| JP | S60-141351 A | 7/1985 |
| JP | H07-223224 A | 8/1995 |
| JP | H10-34658 A | 2/1998 |
| JP | H11-300746 A | 11/1999 |
| JP | 2000-102926 A | 4/2000 |
| JP | 2000-229322 A | 8/2000 |
| JP | 2008-265101 A | 11/2008 |
| JP | 2010-017986 A | 1/2010 |
| JP | 2011-189635 A | 9/2011 |
| JP | 2012-218217 A | 11/2012 |
| JP | 2013-244732 A | 12/2013 |

OTHER PUBLICATIONS

Apr. 12, 2016 Search Report issued in European Patent Application No. 14800967.3.

* cited by examiner

FIG. 4

FIG. 5 A: BENT AMOUNT OF WIRE (AC4C)  B: BENT AMOUNT OF TIRE (AC7A)  C: BENT AMOUNT OF TIRE (AC2B)

METHOD FOR MANUFACTURING MOLD FOR MOLDING TIRE AND MOLD FOR MOLDING TIRE

TECHNICAL FIELD

The present invention relates to a method for manufacturing a mold for molding a tire having a vent hole and to a mold for molding a tire.

BACKGROUND ART

A mold for molding a tire is manufactured by casting using a plaster casting mold in general and is used for tire molding in a vulcanization process. During this tire molding, in order to spread rubber of the tire to every corner of the mold, an air trap between the mold and the tire needs to be eliminated. Thus, a vent hole (air vent hole) is formed in the mold so as to discharge an air between the mold and the tire through the vent hole. Moreover, in order to reliably discharge the air, each of vent holes having a diameter of 0.6 to 1.6 mm is formed in several hundreds to several thousands spots in a pair of molds, for example.

The vent hole is usually formed in the mold by drilling machining or electric discharge machining. Thus, formation of the large number of vent holes takes a lot of labor, and a formable diameter and length of a vent hole is limited. On the other hand, a vent hole forming method for easily forming a vent hole in a mold by a wire cast in a cast metal of the mold has been known (see Patent Literature 1).

In this prior-art method, the vent hole is formed by withdrawing the wire from the cast metal after the cast metal is cast in a casting mold in which the wire is disposed. However, the wire is fixed in the cast metal in a bent and deformed state by a pressure received from a molten metal in some cases. In this case, since the vent hole is also bent, accuracy of the vent hole formed in the mold deteriorates. Moreover, if the vent hole is clogged, clogging of the vent hole is solved by an elongated tool (a drill or the like). At that time, the tool stops in the middle of the vent hole or the tool is broken during insertion into the vent hole in some cases.

CITATION LIST

Patent Literature

PTL 1: Japanese Patent Laid-Open No. 10-34658

SUMMARY OF INVENTION

Technical Problem

The present invention was made in view of the aforementioned prior-art problems and has an object to form a vent hole of a mold with accuracy by suppressing bending deformation of a wire disposed in a casting mold during casting of a mold for molding a tire.

Solution to Problem

The present invention is a method for manufacturing a mold for molding a tire, including the steps of pouring a molten metal into a casting space of a casting mold in which a wire is disposed, casting a cast metal of the mold for molding a tire with the wire cast-in in the casting space, and forming a vent hole by withdrawing the wire from the cast metal, the method further including the steps of calculating a contact angle of the wire at which a bent amount of the wire is within an allowable range from conditions of an actual length and a diameter of the wire by using a relational expression indicating a relation among a length of the wire in the casting space, a diameter of the wire, the contact angle of the wire with respect to the molten metal, and the bent amount of the wire by casting, which is acquired by experiments in advance, and disposing the wire in the casting space on the basis of the calculated contact angle of the wire.

Moreover, the present invention is a mold for molding a tire manufactured by the method for manufacturing a mold for molding a tire of the present invention.

Advantageous Effects of Invention

According to the present invention, the vent hole of the mold can be formed with accuracy by suppressing the bending deformation of the wire disposed in the casting mold during casting of the mold for molding a tire.

DESCRIPTION OF EMBODIMENTS

An embodiment of a method for manufacturing a mold for molding a tire (hereinafter referred to simply as a mold) and a mold manufactured by this manufacturing method of the present invention will be described by referring to the attached drawings.

The mold of each embodiment which will be described below is used for molding of a tire in vulcanization of the tire and molds at least a tread portion of the tire. Moreover, the mold is a split mold split into a plurality of parts in a tire circumferential direction of a tire to be molded and is split by a predetermined split angle around an axis (rotating axis) of the tire. In a vulcanizing machine, a plurality of molds is arranged annularly around the tire (unvulcanized tire), and the tread portion of the tire is molded into a predetermined shape by the plurality of molds.

First Embodiment

Figure 1A:
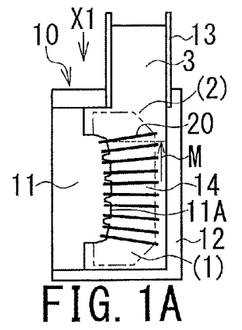
FIGS. 1A to 1D are sectional views illustrating a manufacturing procedure of a mold for molding a tire of a first embodiment of the present invention.
Figure 1B:
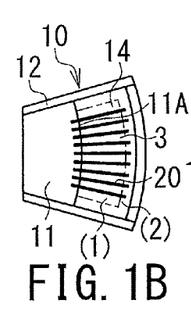
Figure 1C:
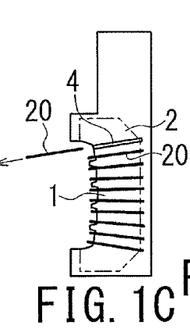
Figure 1D:
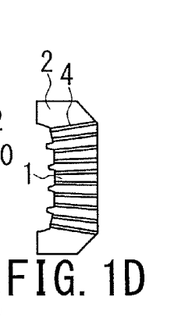

FIGS. 1A to 1D are sectional views illustrating a manufacturing procedure of a mold 1 of a first embodiment, and FIG. 1A illustrates a casting mold 10 when seen from a side. FIG. 1B is a sectional view of the casting mold 10 when seen from an X1 direction of FIG. 1A, and FIG. 1C and FIG. 1D are sectional views of the mold 1 (cast metal 2) corresponding to FIG. 1A. In FIGS. 1A, 1B, and 1C, a portion (product portion) which becomes a product of the mold 1 is indicated by a two-dot chain line. An arrow M illustrated in FIG. 1A indicates a moving direction of a surface (schematically indicated by a dot line) of a molten metal 3 in the casting mold 10.

The casting mold 10 includes a main mold 11 for molding the cast metal 2 of the mold 1, a molding flask 12 accommodating the main mold 11, and a stoke 13 for storing the molten metal 3 as illustrated. The main mold 11 is disposed so as to stand upright on a side of the cast metal 2. A casting space 14 for casting the cast metal 2 is formed in the casting mold 10 by the main mold 11 and the molding flask 12. A linear wire 20 is disposed in the casting space 14.

The main mold 11 has a molding surface 11A of the cast metal 2 and is formed of a plaster. The wire 20 is a linear member (a spring steel wire, for example) for forming a vent hole 4 in the mold 1 and disposed at a plurality of spots in the casting space 14 corresponding to a position of the vent hole 4. Before assembling of the casting mold 10 (see FIGS. 1A and 1B), a base end portion of the wire 20 is inserted into a hole formed in the main mold 11 so that a plurality of wires 20 is mounted on the main mold 11 so as to protrude from the molding surface 11A. In that state, the casting mold 10 is assembled, and the cast metal 2 of the mold 1 is cast.

During casting of the mold 1 (cast metal 2), an alloy is molten, and the molten metal 3 of the alloy is cast in the casting mold 10 (casting space 14). As a result, the molten metal 3 is poured into the casting space 14 of the casting mold 10 in which the wire 20 is disposed. Subsequently, the molten metal 3 is solidified in the casting space 14, and the cast metal 2 (alloy cast metal) of the mold 1 with the wire 20 cast-in is cast. After the cast metal 2 is cast by the casting mold 10 (see FIG. 1C), the cast metal 2 is taken out of the casting mold 10, the plurality of wires 20 is withdrawn from the cast metal 2, and a plurality of vent holes 4 is formed in the cast metal 2. After that, the cast metal 2 is machined, and the mold 1 to be used for molding of a tire is manufactured (see FIG. 1D). The vent holes 4 are formed from a surface for molding the tire of the mold 1 to a rear surface of the mold 1 and penetrate the mold 1.

FIGS. 2A to 2D are sectional views illustrating a forming process of the vent hole 4 by the wire 20.

Figure 2A:
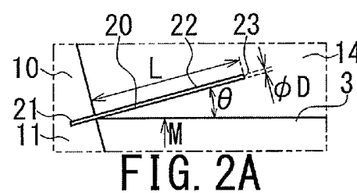
FIGS. 2A to 2D are sectional views illustrating a forming process of a vent hole by a wire.
Figure 2B:
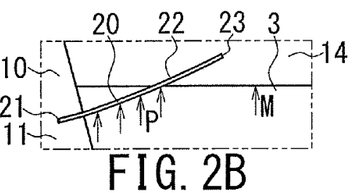

As illustrated, a base end portion 21 of the wire 20 is fixed to the casting mold 10 (main mold 11), and the wire 20 is mounted on the casting mold 10 (see FIG. 2A). As a result, the wire 20 is supported by the casting mold 10 in a state similar to cantilever. Moreover, the wire 20 is made of a material having a melting point higher than a temperature of the molten metal 3 and has a mold releasing agent 22 applied on a surface thereof. The mold releasing agent 22 is an agent for allowing the wire 20 to be withdrawn from the cast metal 2 easily and prevents bonding between the cast metal 2 and the wire 20 during casting. A sectional shape of the wire 20 is circular, and the mold releasing agent 22 is uniformly applied on the whole of the wire 20.

Figure 2C:
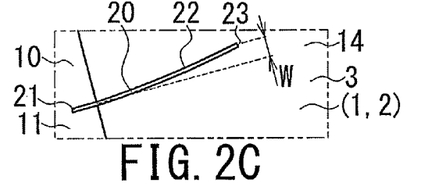
Figure 2D:
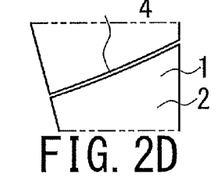

Here, during casting of the mold 1, the wire 20 is bent by a pressure P (see FIG. 2B) received from the molten metal 3, and bending deformation occurs in the wire 20 in some cases (see FIG. 2C). This pressure P is caused by an interfacial tension of the molten metal 3 and a surface film (oxidation film or the like) formed on the molten metal 3 and acts on the wire 20 with contact between the molten metal 3 and the wire 20. Moreover, with movement of the surface of the molten metal 3, the wire 20 is bent by the pressure P, and the molten metal 3 is solidified in a state in which the wire 20 is deformed. In this case, by withdrawing the wire 20 from the cast metal 2, the bent vent hole 4 is formed (see FIG. 2D).

A bent amount W of the wire 20 (see FIG. 2C) is a function of a length L of the wire 20 in the casting space 14 (see FIG. 2A) and a diameter D of the wire 20 in the casting space 14 similarly to a bending expression of cantilever. Moreover, the bent amount W is a function of a contact angle $\theta$ of the wire 20 with respect to the molten metal 3 and the length L of the wire 20 and also depends on a property (interfacial tension, strength of the surface film and the like) of the molten metal 3. In the first embodiment, an expression indicating relation of a plurality of those variables is acquired by experiments, and the bent amount W of the wire 20 is quantitatively predicted, for example. On the basis of the result, conditions of the wire 20 capable of suppressing the bending deformation are set.

Note that the bent amount W of the wire 20 is bending at a tip end portion 23 of the wire 20 and corresponds to a displacement distance of the tip end portion 23 caused by casting of the cast metal 2. That is, the bent amount W is a distance for which the tip end portion 23 is displaced after casting of the cast metal 2 on the basis of the tip end portion 23 before the molten metal 3 is poured. Moreover, the contact angle $\theta$ of the wire 20 (see FIG. 2A) is an angle formed by the surface of the molten metal 3 and the wire 20 when the molten metal 3 is brought into contact with the wire 20. That is, the contact angle $\theta$ is an angle formed by the surface of the molten metal 3 and the wire 20 before the wire 20 enters the molten metal 3 (before the wire 20 is bent).

In the experiment, only a type of the alloy (molten metal 3), the length L of the wire 20, the diameter D of the wire 20, and the contact angle $\theta$ of the wire 20 were changed, and the cast metal 2 of the mold 1 is cast. The wire 20 is made of a spring steel wire (SUP-3) specified by Japanese Industrial Standards (JIS). The mold releasing agent 22 of the wire 20 was a mixed product of an acrylic resin and boron nitride (BN) (powder with average grain size of 10 μm) (acrylic resin: 29%, BN: 71%), and it was applied on the wire 20 with a predetermined thickness. The main mold 11 was made of non-foaming plaster (by Noritake Co., Ltd., product name: G-6).

The alloy was three types of aluminum alloy (AC4C, AC7A, and AC2B) for casting specified by JIS. During casting, a combination of the aforementioned three conditions (L, D, $\theta$) relating to the wire 20 was changed in various ways, while the other casting conditions were set the same. After the cast metal 2 of the mold 1 is cast by each alloy, the bent amount W of the wire 20 by casting of the mold 1 (cast metal 2) was measured.

Figure 3:
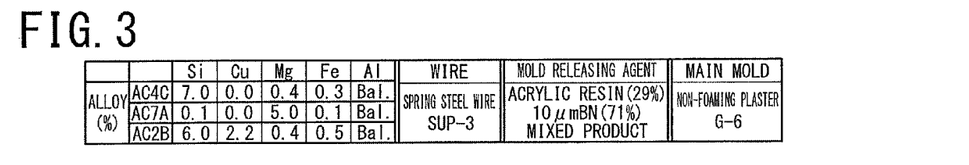
FIG. 3 is a table illustrating compositions of an alloy used for a mold.

FIG. 3 is a table illustrating compositions of the alloy used for the mold 1 and also shows a material of the wire 20 and the like.

Figure 4:
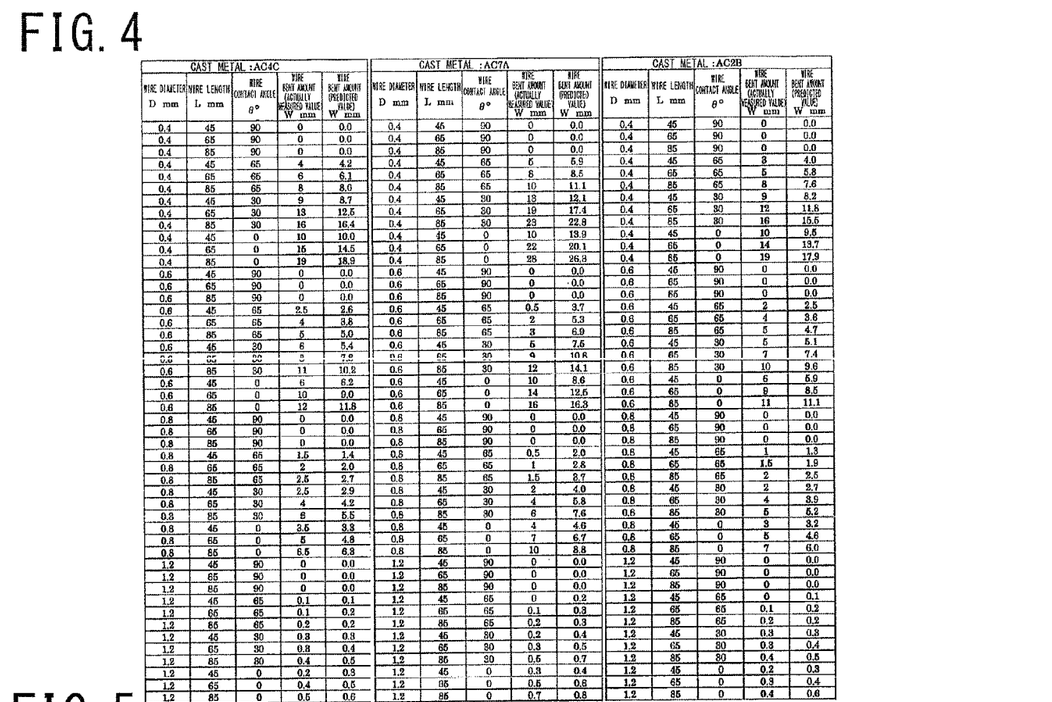
FIG. 4 is a table illustrating results of a casting experiment of the mold in the first embodiment.

FIG. 4 is a table illustrating results of a casting experiment of the mold 1 (cast metal 2) in the first embodiment and shows experimental results for each alloy. Moreover, FIG. 4 is a table arranging experimental conditions (D, L, $\theta$), the bent amounts (actually measured values) W of the wire 20, and the bent amounts (predicted values) W of the wire 20.

In the first embodiment, as illustrated in FIG. 4, data indicating a relation among the four values (D, L, $\theta$, and W) relating to the wire 20 is obtained for each alloy by the casting experiment. Then, on the basis of the obtained data, a relational expression of the length L of the wire 20, the diameter D of the wire 20, the contact angle θ of the wire 20, and the bent amount W of the wire 20 is constructed for each alloy. The relational expression is acquired by multivariate analysis (multiple regression analysis) assuming that the bent amount W of the wire 20 is an objective variable and the length L, the diameter D, and the contact angle θ are explanatory variables, for example. Here, the relational expression was created by using a product of a square of the diameter D and the length L as the explanatory variables.

The relational expressions of the three alloys (AC4C, AC7A, and AC2B) are the following expression A to expression C.

[Formula 1]

$$W=(0.254017D^2-0.676083D+0.452459)L\times\sin(90-\theta) \quad \text{ExpressionA (AC4C)}$$

$$W=(0.352801D^2-0.939004D+0.628416)L\times\sin(90-\theta) \quad \text{ExpressionB (AC7A)}$$

$$W=(0.239904D^2-0.638522D+0.427323)L\times\sin(90-\theta) \quad \text{ExpressionC (AC2B)}$$

These relational expressions are empirical expressions indicating a relation among the plurality of variables (W, D, L, and θ) acquired by the experiments and also are prediction expressions predicting the bent amount W of the wire 20. By calculating the bent amount W from the length L, the diameter D, and the contact angle θ on the basis of the relational expression corresponding to the alloy of the mold 1, the bent amount W occurring during casting is predicted. The bent amount (predicted value) W illustrated in FIG. 4 is a value calculated by the expression A to the expression C.

Figure 5:
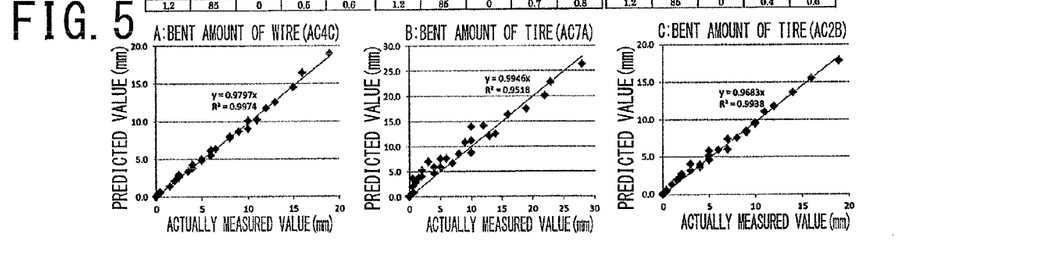
FIG. 5 indicates graphs comparing an actually measured value and a predicted value of a bent amount.

FIG. 5 indicates graphs comparing the actually measured value (lateral axis) and the predicted value (vertical axis) of the bent amount W and illustrates correlation between the actually measured value and the predicted value for each alloy.

As illustrated, the predicted values well match the actually measured values, and the bent amount W of the wire 20 can be predicted by the relational expression with accuracy.

At a stage in which the mold 1 is to be cast, the conditions of the length L of the wire 20, the diameter D of the wire 20, and the contact angle θ of the wire 20 under which the bent amount W of the wire 20 is within an allowable range are calculated (obtained) on the basis of the relational expression acquired by the experiments in advance, for example. Alternatively, on the basis of the relational expression, the condition of the contact angle θ of the wire 20 under which the bent amount W of the wire 20 is within the allowable range is calculated from the length L and the diameter D of the wire 20 actually used for casting of the mold 1. After that, the wire 20 (see FIGS. 2A to 2D) is disposed in the casting space 14 in accordance with the calculated conditions of the wire 20 so as to satisfy the conditions.

Here, the contact angle θ of the wire 20 at which the bent amount W of the wire 20 is within the allowable range is calculated from the conditions of the actual length L and the diameter D of the wire 20 by using the relational expression acquired by the experiment in advance. Moreover, on the basis of the calculated contact angle θ of the wire 20, the wire 20 is disposed in the casting space 14. Specifically, on the basis of the relational expression, the length L of the wire 20, the diameter D of the wire 20, and the allowable range of the bent amount W, the contact angle θ of the wire 20 at which the bent amount W of the wire 20 is within the allowable range is calculated. The allowable range of the bent amount W is determined in advance in response to the condition required for the vent hole 4. In response to the allowable range, the contact angle θ (the condition of the contact angle θ) is calculated from the relational expression, the length L, and the diameter D. Subsequently, the wire 20 with the diameter D is mounted on the casting mold 10 (main mold 11) in the state with the length L. At that time, the wire 20 is disposed in the casting space 14 in accordance with the calculated contact angle θ of the wire 20 so as to satisfy the condition of the contact angle θ. As a result, the wire 20 is disposed under the set condition, the casting mold 10 is assembled, and the cast metal 2 of the mold 1 is cast by the alloy of the relational expression. After that, by withdrawing the wire 20 from the cast metal 2, the vent hole 4 is formed, and the mold 1 having the vent hole 4 is manufactured.

By disposing the wire 20 in the casting mold 10 as described above, the bent amount W of the wire 20 is within the allowable range and thus, bending of the vent hole 4 is suppressed. Therefore, bending deformation of the wire 20 is suppressed during casting of the mold 1 (cast metal 2), and the vent hole 4 of the mold 1 can be formed with accuracy. Moreover, since the vent hole 4 can be brought close to a straight shape, clogging of the vent hole 4 can be solved easily by an elongated tool.

Second Embodiment

The aforementioned relational expressions (expression A to expression C) include a term of sin (90−θ). Thus, if the contact angle θ of the wire 20 is 90°, regardless of the conditions of the length L and the diameter D of the wire 20, the bent amount W of the wire 20 is zero. Paying attention to this characteristic, in a second embodiment, the contact angle θ of the wire 20 is set to 90°, and the wire 20 is disposed in the casting space 14.

Figure 6A:
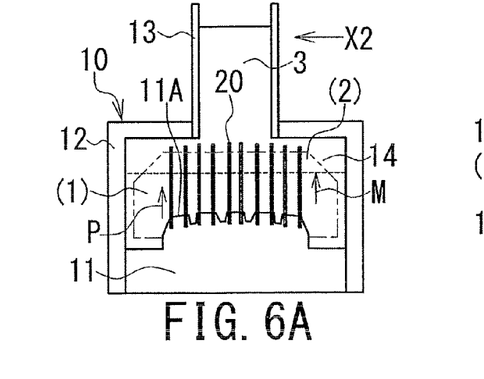
FIGS. 6A and 6B are views illustrating how to dispose the wire in a second embodiment.
Figure 6B:
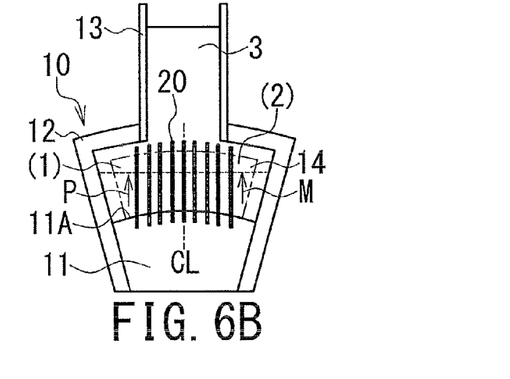

FIGS. 6A and 6B are views illustrating how to dispose the wire 20 in a second embodiment and showing a section of the casting mold 10. Moreover, FIG. 6B is a sectional view of the casting mold 10 when seen from an X2 direction in FIG. 6A. In FIGS. 6A and 6B, a portion which becomes a product of the mold 1 (product portion) is indicated by a two-dot chain line. An arrow M illustrated in FIGS. 6A and 6B indicates the moving direction of the surface (schematically illustrated by a dot line) of the molten metal 3 in the casting mold 10.

In the second embodiment, the main mold 11 is disposed horizontally in a lower part of the cast metal 2. The surface of the molten metal 3 moves upward from the main mold 11 in the casting space 14. By disposing the plurality of wires 20 so as to protrude upward from the main mold 11, the contact angle θ of the wire 20 is set to 90°. As a result, since the wire 20 is disposed along a direction of the pressure P of the molten metal 3, it becomes difficult for the wire 20 to bend by the pressure P, and bending deformation of the wire 20 is suppressed. As a result, since the bent amount W of the wire 20 becomes much smaller, bending of the vent hole 4 can be reliably suppressed. Moreover, accuracy of the vent hole 4 can be further improved, and the vent hole 4 can be made thinner than before.

As described above, if the contact angle θ can be set to 90°, it is preferable that the contact angle θ is set to 90° and the wire 20 is disposed in the casting space 14. The term 90° in relation with the contact angle θ of the wire 20 refers to a predetermined angle range around 90° capable of suppressing bending deformation of the wire 20. That is, the wire 20 is disposed in the casting space 14 in a state in which the contact angle θ is approximately 90° (θ≈90'). Here, the contact angle θ is an angle within a range of 80 to 100°. However, in order to suppress bending deformation of the wire 20 more reliably, the contact angle θ is preferably set to an angle within a range of 85 to 95°.

As described above, the mold 1 is the split mold split into the plurality of parts in the tire circumferential direction, and the vent hole 4 is formed at a plurality of spots of the mold 1. In the second embodiment, by disposing the wires 20 along a center line CL (see FIG. 6B) of the mold 1, the plurality of vent holes 4 is formed along the center line CL. The center line CL of the mold 1 is a center line at a center position of the mold 1 in the tire circumferential direction, and the mold 1 is split by the center line CL into halves between split surfaces. All the vent holes 4 in the mold 1 are formed along the center line CL. Moreover, by disposing the wires 20 in parallel with the center line CL, all the vent holes 4 are formed in parallel with the center line CL.

Third Embodiment

In a third embodiment, in addition to each of the aforementioned embodiments, a thickness of the mold releasing agent 22 required for withdrawing the wire 20 from the cast metal 2 is predicted, and a condition for the thickness of the mold releasing agent 22 is set. As a result, while bending deformation of the wire 20 is suppressed, the wire 20 is reliably withdrawn from the cast metal 2.

FIGS. 7A to 7D are views for explaining withdrawal of the wire 20.

Figure 7A:
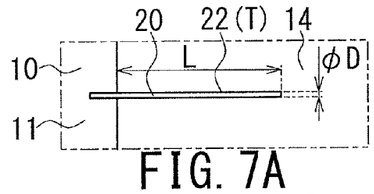
FIGS. 7A to 7D are views for explaining withdrawal of the wire.
Figure 7B:
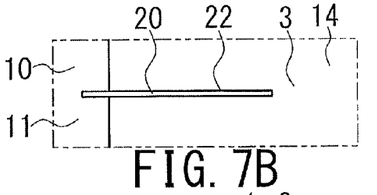
Figure 7C:
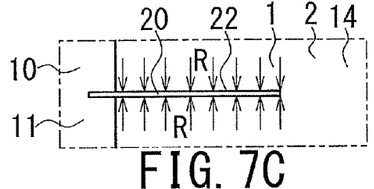
Figure 7D:
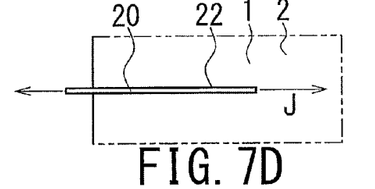

As illustrated, after the molten metal 3 is contracted by solidification in the casting mold 10, the cast metal 2 is contracted by cooling (see FIGS. 7A to 7C). With such contraction, a pressure R (see FIG. 7C) is applied to the wire 20, and a frictional force between the wire 20 and the cast metal 2 becomes larger. When the wire 20 is to be withdrawn from the cast metal 2 (see FIG. 7D), a withdrawal resistance force J is applied to the wire 20 by the pressure R and the frictional force. At that time, if the withdrawal resistance force J is smaller than the strength (breaking strength× sectional area) of the wire 20, the wire 20 is withdrawn from the cast metal 2. On the other hand, if the withdrawal resistance force J is at the strength of the wire 20 or more, the wire 20 is broken and remains in the cast metal 2.

Here, the pressure R received by the wire 20 is in proportion to the diameter D of the wire 20, a thickness T of the mold releasing agent 22, and a solidification/cooling contraction rate of the alloy (characteristic value of the alloy). Moreover, the withdrawal resistance force J is in proportion to the pressure R, an area of an outer periphery of the wire 20 (in proportion to diameter D×length L), and a frictional coefficient (characteristic value of the wire 20 and the alloy) between the wire 20 and the cast metal 2. The strength of the wire 20 is in proportion to a sectional area (in proportion to a square of diameter D) of the wire 20, and the breaking strength of the wire 20 (characteristic value of the wire 20). Therefore, whether or not the wire 20 can be withdrawn from the cast metal 2 is estimated from the length L of the wire 20, the diameter D of the wire 20, the thickness T of the mold releasing agent 22, a wire characteristic, and an alloy characteristic.

In the third embodiment, an expression indicating the relation among the plurality of variables is acquired by experiments, and the thickness T of the mold releasing agent capable of withdrawing the wire 20 is quantitatively predicted. On the basis of the result, the condition of the thickness T of the mold releasing agent 22 is set. In the experiment, only the type of the alloy, the diameter D of the wire 20, the thickness T of the mold releasing agent 22, and the length L of the wire 20 were changed, while the other casting conditions were set the same. Moreover, the alloy, the wire 20, the mold releasing agent 22, and the main mold 11 are made of a material similar to that of the first embodiment (see FIG. 3). Such an experiment was conducted that, after casting was performed under various conditions by the three types of alloys (AC4C, AC7A, and AC2B), the wire 20 was withdrawn from the cast metal 2. Moreover, under each condition, the plurality of wires 20 was withdrawn from the cast metal 2, and a withdrawal success rate was acquired.

Figure 8:
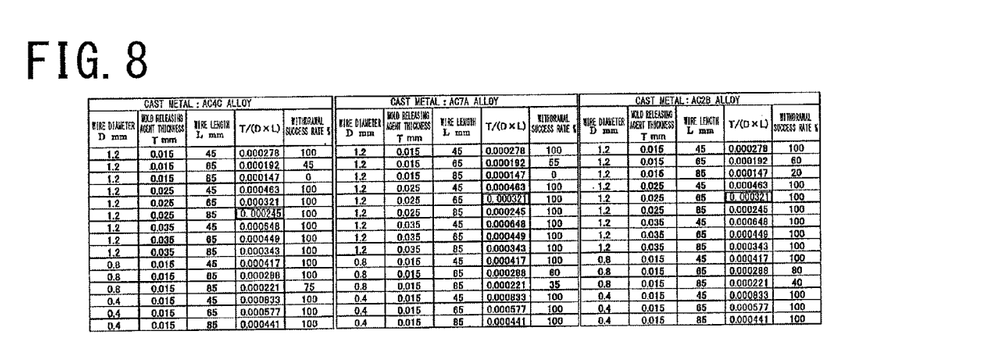
FIG. 8 is a table illustrating results of a withdrawal experiment of the wire in a third embodiment.

FIG. 8 is a table illustrating results of a withdrawal experiment of the wire 20 in the third embodiment and shows experimental results for each alloy. Moreover, FIG. 8 is a table arranging experimental conditions (D, T, L), T/(D×L), and withdrawal success rates.

Figure 9:
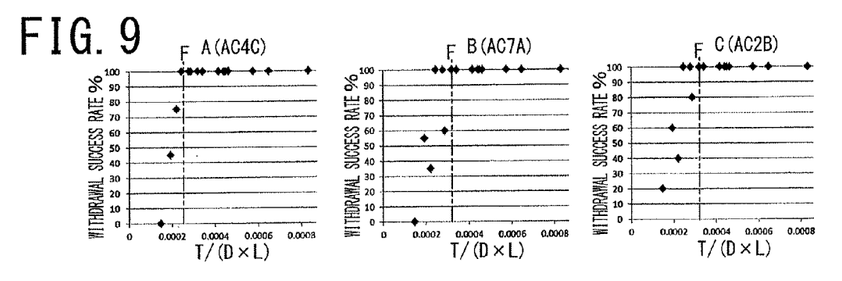
FIG. 9 indicates graphs comparing T/(D×L) and a withdrawal success rate.
Figure 10A:
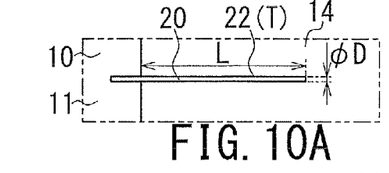
FIGS. 10A to 10F are views for explaining occurrence of a hydrogen gas defect.
Figure 10B:
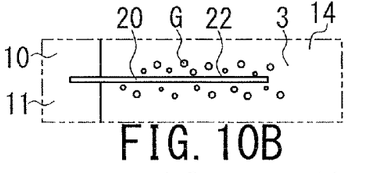
Figure 10C:
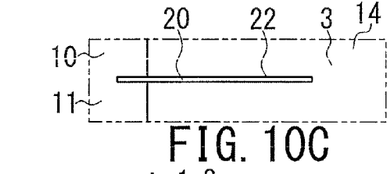
Figure 10D:
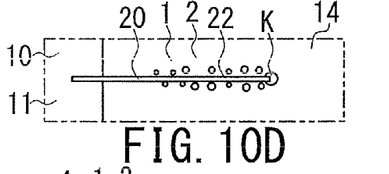
Figure 10E:
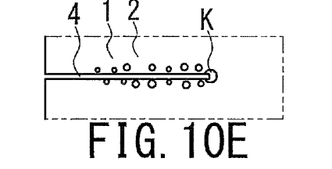
Figure 10F:
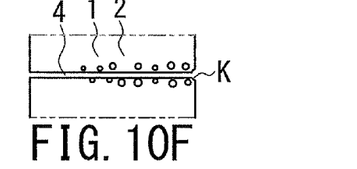

FIG. 9 indicates graphs comparing T/(D×L) (lateral axis) and the withdrawal success rate (vertical axis).

In the third embodiment, as illustrated in FIG. 8, data indicating a relation among the three values (D, T, and L) and the withdrawal success rate is obtained for each alloy by the experiment. Subsequently, on the basis of the obtained data, a relational expression (conditional expression) of the length L of the wire 20, the diameter D of the wire 20, and the thickness T of the mold releasing agent 22 applied on the wire 20, which defines conditions capable of withdrawing the wire 20 from the cast metal 2, is constructed for each alloy. Here, a value of T/(D×L) is calculated from the obtained data and a lower limit value F (constant) of T/(D×L) at which the withdrawal success rate is 100% is obtained.

As a result, as a relational expression (expression D), (T≥F×(D×L)) is obtained. In the example illustrated in FIG. 8 and FIG. 9, the lower limit value F is 0.000245 (AC4C) and 0.000321 (AC7A and AC2B). This relational expression is an empirical expression indicating a relation among the plurality of variables (T, D, and L) acquired by the experiments and also is a prediction expression predicting the thickness T of the mold releasing agent 22 capable of withdrawing the wire 20 from the cast metal 2. By calculating the thickness T of the mold releasing agent 22 from the length L and the diameter D of the wire 20 on the basis of the relational expression corresponding to the alloy of the mold 1, the required thickness T (lower limit value of the thickness T) is predicted.

At a stage in which the mold 1 is to be cast, the condition of the thickness T of the mold releasing agent 22 capable of withdrawing the wire 20 is calculated (obtained) from the conditions of the actual length L of the wire 20 and the diameter D of the wire 20 by using the relational expression acquired by the experiment in advance. Moreover, in accordance with the calculated condition of the thickness T of the mold releasing agent 22, the wire 20 satisfying the condition is disposed in the casting space 14. For example, if the thickness T is at a predetermined value or more, the wire 20 having the mold releasing agent 22 satisfying the condition is disposed. By constituting as above, the wire 20 can be reliably withdrawn from the cast metal 2. If the material of the mold releasing agent 22 or the wire 20 is changed, the relational expression is created similarly to the above, and the condition of the thickness T of the mold releasing agent 22 is calculated.

Fourth Embodiment

In a fourth embodiment, in addition to each of the aforementioned embodiments, whether or not a hydrogen gas defect (hereinafter referred to as gas defect) occurs in the mold 1 (cast metal 2) is predicted from an organic matter amount of the mold releasing agent 22 and an initial hydrogen amount of the molten metal 3. On the basis of the result, a condition that can prevent occurrence of the gas defect is set.

FIGS. 10A to 10F are views for explaining occurrence of a gas defect K.

The mold releasing agent 22 contains an organic matter in general. As illustrated, as the organic matter of the mold releasing agent 22 is burned and decomposed by heat during casting, a gas G is generated in the molten metal 3 (see FIG. 10B). Since oxygen in the gas G is easily bound to metal or carbon of the molten metal 3, oxygen is separated from the molten metal 3 and floated as an oxide or a gas (carbon monoxide, carbon dioxide) (see FIG. 10C). On the other hand, hydrogen in the gas G is easily absorbed by the molten metal 3 and is melted in the molten metal 3 to a predetermined solubility. During solidification of the molten metal 3, a hydrogen gas is generated in the molten metal 3 with a quick drop of the solubility, and the gas defect K occurs in the cast metal 2 in some cases (see FIGS. 10D and 10E). If the gas defect K appears on a surface of the mold 1 or in an inner surface of the vent hole 4, the gas defect K becomes a casting defect (see FIG. 10F).

Here, assume that a hydrogen content (initial hydrogen amount) of the molten metal 3 during being poured into the casting space 14 is Hm and a hydrogen increase amount increasing in the molten metal 3 by the mold releasing agent 20 is Hp. Units of Hm and Hp are (cc/unit weight of alloy) (here, cc/100 g). If a sum of Hm and Hp (hydrogen total amount Hs) is not less than a threshold value specific to the alloy, the gas defect K occurs. After degasification treatment is applied to the molten metal 3 before being poured, a sample sampled from the molten metal 3 is analyzed so that Hm is obtained. Moreover, by an actual casting experiment, Hp and the hydrogen total amount Hs of the cast metal 2 are obtained.

In the fourth embodiment, the mold 1 (cast metal 2) is cast under various conditions by experiments so as to obtain data of Hm, Hs, and Hp and to examine presence of the gas defect K in the cast metal 2. In the experiment, the type of the alloy, the diameter D of the wire 20, the thickness T of the mold releasing agent 22, and the length L of the wire 20 were changed. Moreover, the alloy, the wire 20, the mold releasing agent 22, and the main mold 11 are made of a material similar to that of the first embodiment (see FIG. 3). A predetermined number of (one, here) wires 20 are disposed in the casting space 14, and the cast metal 2 (length: 120 mm, height: 50 mm, and thickness: 20 mm) was cast by the three types of alloys (AC4C, AC7A, and AC2B).

Figure 11:
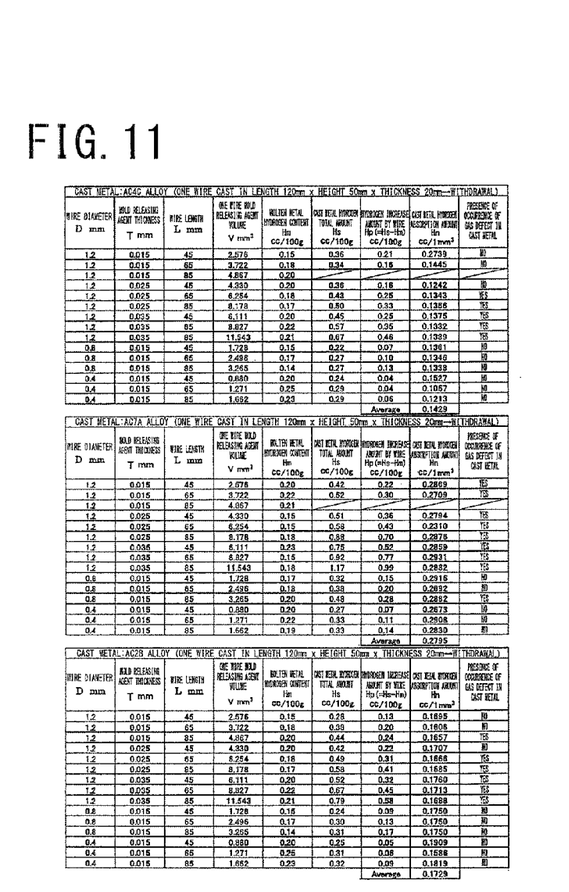
FIG. 11 is a table illustrating results of the casting experiment in a fourth embodiment.

FIG. 11 is a table illustrating results of a casting experiment in the fourth embodiment and shows experimental results for each alloy. Moreover, FIG. 11 is a table arranging experimental conditions (D, T, and L), a volume V of the mold releasing agent 22, an amount of hydrogen (Hm, Hs, Hp, and Hn), and presence of the gas defect K.

The volume V of the mold releasing agent 22 is a volume of the mold releasing agent 22 applied on the one wire 20 and is calculated from the diameter D of the wire 20, the thickness T of the mold releasing agent 22, and the length L of the wire 20. A hydrogen absorption amount Hn is a hydrogen absorption amount of the cast metal 2 per unit volume (1 mm³, here) of the mold releasing agent 22 and is calculated from the hydrogen increase amount Hp, a weight Q of the cast metal 2, the volume V of the mold releasing agent 22, and the number N (total number) of the wires 20 disposed in the casting space 14.

As illustrated in FIG. 11, the hydrogen absorption amount Hn changes depending on the alloy, and averages of the hydrogen absorption amount Hn are 0.1429 (AC4C), 0.2795 (AC7A), and 0.1729 (AC2B). A threshold value of the hydrogen total amount Hs at which the gas defect K occurs may be almost a constant value, which is 0.4 (AC4C, AC7A, and AC2B). Therefore, if the hydrogen total amount Hs is smaller than 0.4, it is predicted that the gas defect K does not occur in the cast metal 2. On the other hand, if the hydrogen total amount Hs is at 0.4 or more, it is predicted that the gas defect K occurs in the cast metal 2. In the fourth embodiment, on the basis of the hydrogen total amount Hs of the cast metal 2 and the threshold value (0.4), a relational expression (expression E) relating to occurrence of the gas defect K is acquired, and it is predicted whether or not the gas defect K occurs.

[Formula 2]

$$0.4 > Hm + \pi L\{(T+D/2)^2 - (D/2)^2\} \times N \times Y / \{10Q\} \, Y = \{AC4C:0.1429, AC7A:0.2795, AC2B: 0.1729\} \quad \text{Expression E}$$

The hydrogen total amount Hs is a sum of the hydrogen content Hm of the molten metal 3 and the hydrogen increase amount Hp. Moreover, as illustrated in the relational expression, the hydrogen increase amount Hp is calculated from the length L of the wire 20, the thickness T of the mold releasing agent 22, the diameter D of the wire 20, the number N of the wires 20, the constant for each alloy (corresponding to the average of Hn), and the weight Q (kg) of the cast metal 2. This relational expression is an empirical expression indicating the relation among the plurality of variables (Hm, L, T, D, N, and Q) acquired by the experiments and also is a prediction expression predicting presence of occurrence of the gas defect K. On the basis of the relational expression corresponding to the alloy of the mold 1, by comparing the hydrogen total amount Hs calculated by the plurality of variables and the threshold value (0.4), presence of occurrence of the gas defect K is predicted.

As described above, in the fourth embodiment, data indicating a relation among the four values (Hm, L, T, D, N, and Q) and presence of the gas defect K is obtained for each alloy by experiments. Subsequently, on the basis of the obtained data, data relating to the relational expression is obtained. Moreover, on the basis of the obtained data, a relational expression (conditional expression) of the hydrogen content Hm, the weight Q of the cast metal, the thickness T of the mold releasing agent 22, the length L of the wire 20, the diameter D of the wire 20, and the number N of the wires 20, which defines a condition capable of preventing occurrence of the gas defect K, is constructed for each alloy.

At a stage in which the mold 1 is to be cast, by using the relational expression acquired by the experiment in advance, the conditions of the length L of the wire 20 and the number N of the wires 20, capable of preventing occurrence of the gas defect K are calculated (obtained) from the conditions of the actual hydrogen content Hm, the weight Q, the diameter D, and the thickness T. Moreover, on the basis of the calculated conditions of the length L and the number N of the wires 20, the wire 20 is disposed in the casting space 14 so as to satisfy the conditions. If (L×N) is smaller than a predetermined value, for example, the length L and the number N are determined so as to satisfy the conditions. By constituting as above, occurrence of the gas defect K can be suppressed. Note that if the material of the alloy or the mold releasing agent 22 is changed, the relational expression is created similarly to the above, and occurrence of the gas defect K is predicted.

(Manufacture Test of Mold 1)

In order to confirm the effects of the present invention, a test of manufacturing the mold 1 by the manufacturing method described above was conducted. Test conditions are as follows:

Cast metal 2: ring shape (inner diameter (φ600 mm), outer diameter (φ750 mm), height (300 mm), weight (350 kg))

Alloy: AC4C, hydrogen content Hm (0.2 cc/100 g)

Wire 20: diameter D (1.2 mm), length L (65 mm), number N (1200)

Mold releasing agent 22: mixed product of acrylic resin and BN (see FIG. 3)

Contact angle θ of wire 20: 0 to 30°

On the basis of the relational expression (expression A), the bent amount W of the wire 20 is calculated to be 0.39 to 0.45 mm within the allowable range. In the cast metal 2 in which the wire 20 is disposed under the aforementioned condition, the bent amount W (actually measured value) of the wire 20 was within the allowable range, and bending deformation of the wire 20 was able to be suppressed.

Moreover, on the basis of the relational expression (expression D), the thickness T of the mold releasing agent 22 capable of withdrawing the wire 20 is 0.019 mm or more. In order to satisfy this condition, the thickness T of the mold releasing agent 22 was set to 0.02 mm. As a result, the withdrawal success rate of the wire 20 was 100%.

If the thickness T is 0.02 mm, on the basis of the relational expression (expression E), the number N of the wires 20 capable of preventing occurrence of the gas defect K is less than 1982. Actually, occurrence of the gas defect K was able to be suppressed at all the 1200 spots.

Subsequently, the mold 1 was manufactured under a test condition illustrated below:

Cast metal 2: a fan shape obtained by splitting a ring shape by a split angle 45° (weight (80 kg))

Alloy: AC7A, hydrogen content Hm (0.15 cc/100 g)

Wire 20: diameter D (0.6 mm), length L (65 mm), number N (130)

Mold releasing agent 22: mixed product of acrylic resin and BN (see FIG. 3), thickness T (0.015 mm)

In a comparative example, the contact angle θ of the wire 20 was 30°, and the bent amount W of the wire 20 was 10 to 12 mm. On the other hand, in an example, the contact angle θ of the wire 20 was set to 85°. As a result, the bent amount W of the wire 20 was 0 to 1 mm, and the bent amount W was drastically made small. In the comparative example and the example, the withdrawal success rate of the wire 20 was 100%, and occurrence of the gas defect K was able to be suppressed.

REFERENCE SIGNS LIST 1 mold
2 cast metal
3 molten metal
4 vent hole
10 casting mold
11 main mold
12 molding flask
13 stoke
14 casting space
20 wire
21 base end portion
22 mold releasing agent
23 tip end portion

The invention claimed is:

1. A method for manufacturing a mold for molding a tire, comprising the steps of:
   pouring a molten metal into a casting space of a casting mold in which a wire is disposed;
   casting a cast metal of the mold for molding a tire with the wire cast-in in the casting space; and
   forming a vent hole by withdrawing the wire from the cast metal;
   the method further comprising the steps of:
   calculating a contact angle of the wire at which a bent amount of the wire is within an allowable range from conditions of an actual length and a diameter of the wire by using a relational expression indicating a relation among a length of the wire in the casting space, a diameter of the wire, the contact angle of the wire with respect to the molten metal, and the bent amount of the wire by casting, which is acquired by experiments in advance; and
   disposing the wire in the casting space on the basis of the calculated contact angle of the wire.

2. The method for manufacturing a mold for molding a tire according to claim 1, wherein the step of disposing the wire has the step of disposing the wire in the casting space by setting the contact angle of the wire to 90°.

3. The method for manufacturing a mold for molding a tire according to claim 1, further comprising the step of calculating a condition of a thickness of a mold releasing agent capable of withdrawing the wire from the conditions of the actual length and the diameter of the wire by using a relational expression indicating a relation among the length of the wire in the casting space, the diameter of the wire, and the thickness of the mold releasing agent applied on the wire, which is acquired by experiments in advance and defines a condition capable of withdrawing the wire from the cast metal, wherein the step of disposing the wire has the step of disposing the wire satisfying the calculated condition of the thickness of the mold releasing agent in the casting space.

4. The method for manufacturing a mold for molding a tire according to claim 1, further comprising the step of calculating conditions of the length and the number of wires capable of preventing occurrence of a hydrogen gas defect from the conditions of an actual hydrogen content of the molten metal, the weight of the cast metal, the diameter of the wire, and the thickness of mold releasing agent by using a relational expression indicating a relation among the hydrogen content of the molten metal, the weight of the cast metal, the thickness of the mold releasing agent applied on the wire, the length of the wire in the casting space, the diameter of the wire, and the number of wires disposed in the casting space, which is acquired by experiments in advance and defines a condition capable of preventing occurrence of the hydrogen gas defect, wherein the step of disposing the wire has the step of disposing the wire in the casting space on the basis of the calculated conditions of the length and the number of the wires.

* * * * *